United States Patent [19]

Hamada et al.

[11] Patent Number: 5,372,855
[45] Date of Patent: Dec. 13, 1994

[54] TREATMENT OF INORGANIC BUILDING MATERIALS

[75] Inventors: Keishi Hamada, Omiya; Fumio Tashiro, Hitachi; Shigemasa Otani, Katsuta; Kanemasa Nomaguchi, Hitachi; Tomiguyu Murakami, Hitachi; Sadayoshi Iijima, Hitachi, all of Japan

[73] Assignee: Hitachi Chemical Company Ltd., Tokyo, Japan

[21] Appl. No.: 973,539

[22] Filed: Nov. 9, 1992

Related U.S. Application Data

[60] Continuation of Ser. No. 684,380, Apr. 12, 1991, abandoned, which is a division of Ser. No. 314,888, Feb. 24, 1989, Pat. No. 5,032,136.

[30] Foreign Application Priority Data

Feb. 26, 1988 [JP] Japan .................................. 63-44841
Mar. 17, 1988 [JP] Japan .................................. 63-64145

[51] Int. Cl.5 .......................... B05D 1/36; B05D 7/24
[52] U.S. Cl. ............................... 427/393.6; 427/140; 427/407.1; 427/419.8
[58] Field of Search .................. 427/393.6, 140, 136, 427/407.1, 397.7, 419.8, 419.5; 588/254

[56] References Cited

U.S. PATENT DOCUMENTS

| | | | |
|---|---|---|---|
| 3,996,396 | 12/1976 | Hansen et al. | 427/140 |
| 4,234,711 | 11/1980 | Emmons et al. | 526/282 |
| 4,263,372 | 4/1981 | Emmons et al. | 428/446 |
| 4,299,761 | 11/1981 | Emmons et al. | 428/136 |
| 4,310,370 | 1/1982 | Arai et al. | 156/220 |
| 4,311,624 | 1/1982 | Emmons et al. | 427/388.2 |
| 4,400,413 | 8/1983 | Emmons et al. | 427/136 |
| 4,421,782 | 12/1983 | Bolgiano et al. | 427/53.1 |
| 4,460,625 | 7/1984 | Emmons et al. | 427/136 |
| 4,505,954 | 3/1985 | Hokamura et al. | 427/380 |
| 4,556,701 | 12/1985 | Schindler et al. | 522/22 |
| 5,023,136 | 6/1991 | Hamada et al. | 427/407.1 |
| 5,120,574 | 6/1992 | Cogliano et al. | 427/140 |

Primary Examiner—Shrive Beck
Assistant Examiner—Diana Dudash
Attorney, Agent, or Firm—Antonelli, Terry, Stout & Kraus

[57] ABSTRACT

Inorganic building materials such as asbestos slates treated by coating thereon a composition comprising an acrylate compound such as dicyclopentyloxyethyl methacrylate and a curing agent for weather resistance, strength and waterproofness.

10 Claims, No Drawings

TREATMENT OF INORGANIC BUILDING MATERIALS

This application is a continuation application of application Ser. No. 684,380, filed Apr. 12, 1991, now abandoned, which application is a divisional application of application Ser. No. 314,888, filed Feb. 24, 1989 (now U.S. Pat. No. 5,023,136).

BACKGROUND OF THE INVENTION

This invention relates to a process for treating (e.g. repairing) inorganic building materials such as asbestos slates.

When asbestos slates which are used as roof tiles and the like are aged, these slates are exchanged for new ones, or repaired by removing earth and sand, moss, etc., deposited on or adhered to surfaces thereof, by blowing highly pressurized water against the surfaces or by brushing with a wire brush to completely remove aged portions, followed by coating again. According to the former exchanging method, it requires a great deal of labor and expense. On the other hand, according to the latter reparing method, there are many problems in that incomplete removal of the contaminants readily brings about peeling of coating in an early time due to weak adhesiveness, strength of asbestos slates is lowered by the use of highly pressurized water and brushing, floating of asbestos powder which is harmful for human bodies and generated by brushing aged surfaces of asbestos slates brings about problems on safety and environmental pollution.

In order to overcome some of these problems, Japanese Patent Unexamined Publication No. 59-173462 discloses a process for repairing asbestos slates comprising coating a polyisocyanate compound on surfaces of asbestos slates for impregnation, curing said compound, and coating a coating composition thereon. According to this process, the asbestos slates can be regenerated so as to have original strength and excellent durability, but there are many problems in that the range of molecular weight of polyisocyanate compound is very limited, the use of a solvent is essential in order to impregnate the polyisocyanate compound, which results in causing many problems on workability, safety, etc., and the process becomes elaborate and uneconomical due to the surface coating so as to provide weather resistance.

SUMMARY OF THE INVENTION

It is an object of the present invention to provide a process for treating inorganic building materials such as asbestos slates and inorganic building materials such as asbestos slates thus repaired, overcoming the problems mentioned above without removing aged portions of asbestos slates, without adjusting the molecular weight and without using a solvent.

The present invention provides a process for treating an inorganic building material such as an asbestos slate which comprises coating a composition comprising as an essential component a compound of the formula:

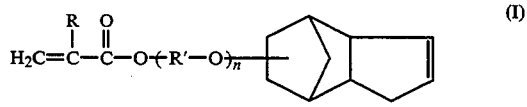

wherein R is hydrogen or a methyl group; R' is an alkylene group having 2 to 13 carbon atoms or an oxaalkylene group having 4 to 6 carbon atoms as a total obtained by bonding two or more alkylene chain segments having 2 or more carbon atoms each via an oxygen atom; and n is zero or an integer of 1, on a cleaned surface of the inorganic building material, followed by curing.

The present invention also provides an inorganic building material such as an asbestos slate thus treated.

DESCRIPTION OF THE PREFERRED EMBODIMENTS

The present invention can be applied to inorganic building materials such as asbestos slates, inorganic roof tiles, concrete outer walls, asbestos-cement plates, asbestos pipes, etc. The composition used for treating (e.g. repairing) inorganic building materials such as asbestos slates comprises as an essential component a compound of the formula:

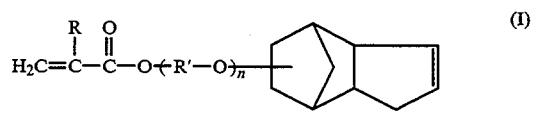

wherein R is hydrogen or a methyl group; R' is an alkylene group having 2 to 13 carbon atoms or an oxaalkylene group of 4 to 6 total carbon atoms obtained by bonding two or more alkylene chain segments having 2 or more carbon atoms each via an oxygen atom; and n is zero or an integer of 1.

Concrete examples of the oxaalkylene group are $-C_2H_4-O-C_2H_4-$, $-C_2H_4-O-C_2H_4-O-C_2H_4-$, $-C_2H_4-O-C_3H_6-$, etc.

Examples of the compound of the formula (I) are dicyclopentenyl acrylate, dicyclopentenyl methacrylate, dicyclopentenyloxyethyl acrylate, dicyclopentenyloxyethyl methacrylate, dicyclopentenyloxyisopropyl acrylate, dicyclopentenyloxyisopropyl methacrylate, dicyclopentenyloxyneopentyl acrylate, dicyclopentenyloxyneopentyl methacrylate, diethylene glycol monodicyclopentenyl ether acrylate, diethylene glycol monodicyclopentenyl ether methacrylate, etc. These compounds can be used alone or as a mixture thereof.

It is possible to use one or more conventionally used acrylic acid esters and methacrylic acid esters together with the compound of the formula (I). In this case, these acrylic or methacrylic acid esters can be used in an amount of preferably 0 to 75% by weight, more preferably 0 to 50% by weight, so long as the effects of the present invention are not lowered.

The composition used in the present invention may further contain one or more curing agents, and if necessary, various additives and curing accelerators.

As the curing agent, there can be used polymerization initiators such as organic peroxides. As the organic peroxides, there can preferably be used peroxides derived from hydrocarbons having about 2 to 18 carbon atoms, hydroperoxides, etc. Examples of the curing agent are t-butyl hydroperoxide, cumene hydroperoxide, methyl ethyl ketone hydroperoxide, diisopropylbenzene hydroperoxide, benzoyl peroxide, t-butyl perbenzoate, 2,2-bis(t-butylperoxy)butane, bis(1-hydroxycyclohexyl) butane, bis(1-hydroxycyclohexyl)peroxide, t-butylperoxyisopropyl carbonate, etc.

These curing agents can be used in an amount of preferably 2 to 6% by volume, more preferably 3 to 5% by volume, based on the compound of the formula (I) or a total of the compound of the formula (I) and co-used one or more acrylic acid esters and methacrylic acid esters.

As the curing accelerator, there can be used aromatic amines such as aniline, N,N-dimethylaniline, N,N-diethylaniline, toluidine, N,N-dimethyl-p-toluidine, N,N-di(hydroxyethyl)toluidine, p-dimethylaminobenzaldehyde, etc. The curing accelerator can be used in an amount of preferably 0 to 4% by volume, more preferably 1 to 3% by volume, based on the compound of the formula (I) or a total of the compound of the formula (I) and co-used one or more acrylic acid esters and methacrylic acid esters.

The use of benzoyl peroxide as the curing agent and N,N-dimethyl-p-toluidine as the curing accelerator is particularly preferable.

As the additive, there can be used an accelerating agent which can further accelerate the function of the curing agent or the function of the curing agent and the curing accelerator to accelerate oxidation curing. As such an accelerating agent, there can be used drying agent salts such as metal salts of naphthenic acid, and fatty acid having upto about 30 carbon atoms. Examples of the metal component are calcium, cupper (II), zinc (II), manganese (II), manganese (III), lead (II), cobalt (II), iron (II), vanadium (II), zirconium (IV), etc. Examples of the acid component are resin acid (i.e. rosinic acid), tall oil fatty acid, linseed oil fatty acid, 2-ethylhexanoic acid, lauric acid, palmitic acid, myristic acid, oleic acid, linoleic acid, linolenic acid, behenic acid, cerotic acid, montanic acid, abietic acid, etc. These accelerating agents can be used alone or as a mixture thereof. The accelerating agent can be used in an amount of preferably 0 to 2% by volume, more preferably 0.3 to 1% by volume based on the compound of the formula (I) or a total of the compound of the formula (I) and co-used one or more acrylic acid esters and methacrylic acid esters.

Individual components mentioned above are mixed, preferably just before use according to a conventional method. The resulting composition can be coated on inorganic building materials such as asbestos slates by spray coating, brush coating, and the like for impregnation, followed by curing at ordinary temperatures. The coating amount is preferably 0.4 to 0.8 kg/m$^2$, more preferably 0.5 to 0.6 kg/m$^2$.

In the present invention, it is not necessary to blow highly pressurized water against aged asbestos slates or to brush surfaces of aged asbestos slates before coating, but it is sufficient only to remove deposited earth and sand with a broom.

The thus repaired inorganic building materials such as asbestos slates have sufficient weather resistance, strength and waterproofness. In order to further improve weather resistance and to provide beauty surface, it is possible to coat an ordinary temperature drying acrylic coating composition, an acrylic urethane coating composition, a natural asphalt aluminum coating composition, or the like on the repaired inorganic building materials.

The compound of the formula (I) has a low viscosity, is not necessary to be dissolved in a solvent, and has high impregnating properties, high adhesiveness to asbestos slates or the like inorganic materials and a high flash point, so that the use of the composition comprising such a compound of the formula (I) as an essential component is very advantageous for treating (e.g. repairing) inorganic building materials such as asbestos slates.

The present invention is illustrated by way of the following Examples, in which all percents are by weight unless otherwise specified.

EXAMPLE 1

A composition was prepared by mixing dicyclopentenyloxyethyl methacrylate with 4% by volume of cumene hydroperoxide and 2% by volume of cobalt naphthenate (activity 6%) with stirring.

A roof with large wavy asbestos slates used for 15 years was cleaned with a broom to remove earth and sand, and fallen leaves, followed by coating of the composition in an amount of 0.5 kg/m$^2$ by spraying thereon. After 3 days from the spray coating, adhesiveness, water absorption, failure in bending and high-impact properties were tested.

EXAMPLE 2

A roof with large wavy asbestos slates used for 15 years was cleaned with a broom to remove earth and sand, and fallen leaves, followed by removal of aged portions on the surface with a wire brush. The aged portions in powder form was 0.12 kg/m$^2$. Then the cleaned roof surface was spray coated with a composition comprising dicyclopentenyloxyethyl methacrylate, 4% by volume of cumene hydroperoxide and 2% by volume of cobalt naphthenate (activity 6%) in an amount of 0.5 kg/cm$^2$. After 3 days, adhesiveness was tested.

EXAMPLE 3

After conducting the process of Example 1, an ordinary temperature drying acrylic coating composition (HISTAR ASCOAT II, a trade name, mfd. by Hitachi Kasei Koozai Co., Ltd.) was spray coated thereon in an amount of 0.5 kg/m$^2$. After 3 days, adhesiveness was tested.

EXAMPLE 4

After conducting the process of Example 2, an ordinary temperature drying acrylic coating coating composition (HISTAR ASCOAT II, a trade name, mfd. by Hitachi Kasei Koozai Co., Ltd.) was spray coated thereon in an amount of 0.5 kg/m$^2$. After 3 days, adhesiveness was tested.

EXAMPLE 5

A roof with large wavy asbestos slates used for 18 years was cleaned with a broom to remove earth and sand, and fallen leaves, followed by spray coating of a composition comprising dicyclopentenyloxyisopropyl methacrylate, 4% by volume of benzoyl peroxide and 1% by volume of dimethyl aniline in an amount of 0.6 kg/m$^2$. After 24 hours from the coating, a natural asphalt silver coating composition (HISTAR ASCOAT SILVER, a trade name, mfd. by Hitachi Kasei Koozai Co., Ltd.) was coated thereon in an amount of 0.5 kg/m$^2$. After 3 days, adhesiveness, water absorption, failure in bending and high-impact properties were tested.

Comparative Example 1

A roof with large wavy asbestos slates used for 15 years was cleaned with a broom to remove earth and sand, and fallen leaves, followed by spray coating of a polyisocyanate compound (GRS-PR, a trade name, mfd. by Hitachi Kasei Koozai Co., Ltd., containing 60% of a solvent) in an amount of 0.5 kg/m$^2$. After 3 days, adhesiveness, water absorption, failure in bending and high-impact properties were tested.

Comparative Example 2

After removing aged surface portions of asbestos slates in the same manner as described in Example 2, a polyisocyanate compound (GRS-PR, a trade name, mfd. by Hitachi Kasei Koozai Co., Ltd., containing 60% of a solvent) was spray coated in an amount of 0.5 kg/m$^2$. After 3 days, adhesiveness was tested.

Comparative Example 3

After conducting the process of Comparative Example 1, an ordinary temperature drying acrylic coating composition (HISTAR ASCOAT II, a trade name, mfd. by Hitachi Kasei Koozai Co., Ltd.) was spray coated thereon in an amount of 0.5 kg/m$^2$. After 3 days, adhesiveness was tested.

Comparative Example 4

After conducting the process of Comparative Example 2, an ordinary temperature drying acrylic coating composition (HISTAR ASCOAT II, a trade name, mfd. by Hitachi Kasei Koozai Co., Ltd.) was spray coated thereon in an amount of 0.5 kg/m$^2$. After 3 days, adhesiveness was tested.

Comparative Example 5

A roof with large wavy asbestos slates used for 15 years was cleaned with a broom to remove earth and sand, and fallen leaves, followed by spray coating of an epoxy compound (Epikote 1001, a trade name, mfd. by Yuka Shell Epoxy Kabushiki Kaisha, solid content 20%, and 80% of a mixed solvent of toluene and butanol) in an amount of 0.5 kg/m$^2$. After 3 days, adhesiveness, water absorption, failure in bending and high-impact properties were tested.

Comparative Example 6

After removing aged surface portions of asbestos slates in the same manner as described in Example 2, the same epoxy compound as used in Comparative Example 5 was spray coated in an amount of 0.5 kg/m$^2$. After 3 days, adhesiveness was tested.

Comparative Example 7

After conducting the process of Comparative Example 5, an ordinary temperature drying acrylic coating composition (HISTAR ASCOAT II, a trade name, mfd. by Hitachi Kasei Koozai Co., Ltd.) was spray coated thereon in an amount of 0.5 kg/m$^2$. After 3 days, adhesiveness was tested.

Comparative Example 8

After conducting the process of Comparative Example 6, an ordinary temperature drying acrylic coating composition (HISTAR ASCOAT II, a trade name, mfd. by Hitachi Kasei Koozai Co., Ltd.) was spray coated thereon in an amount of 0.5 kg/m$^2$. After 3 days, adhesiveness was tested.

Comparative Example 9

A roof with large wavy asbestos slates used for 15 years was cleaned with a broom to remove earth and sand, and fallen leaves, followed by direct spray coating of an ordinary temperature drying acrylic coating composition (HISTAR ASCOAT II, a trade name, mfd. by Hitachi Kasei Koozai Co., Ltd.) in an amount of 0.5 kg/m$^2$. After 3 days, adhesiveness was tested.

Comparative Example 10

After removing aged surface portions of asbestos slates in the same manner as described in Example 2, an ordinary temperature drying acrylic coating composition (HISTAR ASCOAT II, a trade name, mfd. by Hitachi Kasei Koozai Co., Ltd.) was directly spray coated thereon in an amount of 0.5 kg/m$^2$. After 3 days, adhesiveness was tested.

Comparative Example 11

A roof with large wavy asbestos slates used for 15 years was subjected to tests for water absorption, failure in bending and high-impact properties.

In the above-mentioned Examples and Comparative Examples, the tests were carried out as follows.

Adhesiveness

Using a cutter, 100 squares each having a size of 2 mm$\times$2 mm were formed on a coated layer according to JIS K 5400 defining a cross cut test for ordinary coating. Then, an adhesive cellophane tape was adhered to the squares and peeled off. Number of retained squares per 100 squares was counted for evaluation of adhesiveness.

Water absorption

Water absorption was tested according to JIS A 5403 for asbestos slates and expressed by % after 24 hours.

Failure in bending

Failure in bending was tested according to JIS A 5403 for asbestos slates and expressed by kgf.

High-impact properties

According to JIS A 5403 for asbestos slates.

Weather resistance

After allowed to stand outdoors for one year, surface state was observed by the naked eye.

The results are shown in Tables 1 and 2.

TABLE 1

| Example No. | Adhesiveness | Weather resistance |
|---|---|---|
| Example | | |
| 1 | 100/100 | No change |
| 2 | 100/100 | No change |
| 3 | 100/100 | No change |
| 4 | 100/100 | No change |
| 5 | 100/100 | No change |
| Comparative Example | | |
| 1 | 30/100 | Peeled |
| 2 | 60/100 | Peeled |
| 3 | 40/100 | Peeled |
| 4 | 65/100 | Peeled |
| 5 | 40/100 | Peeled |
| 6 | 65/100 | Peeled |
| 7 | 45/100 | Peeled |
| 8 | 70/100 | Peeled |
| 9 | 0/100 | Peeled |
| 10 | 20/100 | Peeled |

TABLE 2

| Example No. | Water absorption (%) | Failure in bending (kgf) | High-impact properties |
|---|---|---|---|
| Example | | | |
| 1 | 0.15 | 440 | Excellent |
| 5 | 0.20 | 430 | Excellent |
| Comparative Example | | | |
| 1 | 7.0 | 320 | Cracked |
| 5 | 3.0 | 350 | Cracked |
| 11 | 13.7 | 310 | Cracked |

According to the present invention, since aged materials on inorganic building materials such as asbestos slates are not required to be removed by blowing of highly pressurized water or brushing with a wire brush, repairing steps can be simplified and floating of asbestos dust from surfaces of asbestos slates caused by cleaning can be prevented to ensure clean working environment. Further, since the composition used therein is not dissolved by using an organic solvent, the workability and safety can be improved.

Further, inorganic building materials such as asbestos slates repaired by the process of the present invention are excellent in adhesiveness between the asbestos slate and the repairing material and between the repairing material and the overcoating, high in strength and improved in weather resistance, waterproofness and high-impact properties. Still further, the resulting repairing effects can be maintained for a long period of time.

What is claimed is:

1. A process for repairing an aged asbestos slate, which comprises cleaning the aged asbestos slate without removing aged portions of the slate, and coating a composition consisting essentially of (1) a curable component consisting of 100 to 25% by weight of a compound of the formula:

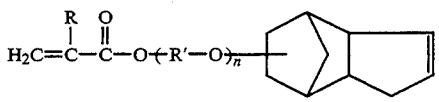

wherein R is hydrogen or a methyl group, R' is an alkylene group having 2 to 13 carbon atoms or an oxaalkylene group having 2 to 6 carbon atoms as a total obtained by bonding two or more alkylene chain segments having 2 or more carbon atoms via an oxygen atom, and n is zero or an integer of 1 and 0 to 75% by weight of one or more acrylic and/or methacrylic esters; and (2) a curing component consisting essentially of 2 to 6% by volume of an organic peroxide as a curing agent based on the volume of the total of the compound of the formula (I) and the acrylic acid esters and methacrylic acid esters, on a cleaned surface of the aged asbestos slate and curing at ambient temperatures thereby producing a repaired asbestos slate having weather resistance and waterproofness.

2. A process according to claim 1, wherein the compound of the formula (I) is at least one member selected from the group consisting of dicyclopentenyl acrylate, dicyclopentenyl methacrylate, dicyclopentenyloxyethyl acrylate, dicyclopentenyloxyethyl methacrylate, dicyclopentenyloxyisopropyl acrylate, dicyclopentenyloxyisopropyl methacrylate, dicyclopentenyloxyneopentyl acrylate, dicyclopentenyloxyneopentyl methacrylate, diethylene glycol monodicyclopentenyl ether acrylate, and diethylene glycol monodicyclopentenyl ether methacrylate.

3. A process according to claim 1, which further comprises coating a room temperature drying acrylic coating composition, an acrylic urethane coating composition, or a natural asphalt aluminum coating composition on the repaired asbestos slate.

4. A process according to claim 1, wherein the composition is coated on the asbestos slate in an amount of 0.4 to 0.8 kg/m$^2$.

5. A process according to claim 1, wherein said aged asbestos slate is exposed to environmental conditions for a period of years prior to being repaired, said repairing of the aged asbestos slate being effected without using an organic solvent.

6. A process for repairing an aged asbestos slate, which comprises cleaning the aged asbestos slate without removing aged portions of the slate, and coating a composition consisting essentially of (1) a curable component consisting of 100 to 25% by weight of a compound of the formula:

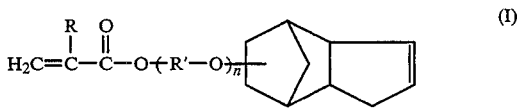

wherein R is hydrogen or a methyl group, R' is an alkylene group having 2 to 13 carbon atoms or an oxaalkylene having 2 to 6 carbon atoms as a total obtained by bonding two or more alkylene chain segments having 2 or more carbon atoms via an oxygen atom, and n is zero or an integer of 1 and 0 to 75% by weight of one or more acrylic and/or methacrylic esters; and (2) a curing component consisting essentially of 2 to 6% by volume of an organic peroxide as a curing agent and a curing accelerator in an amount of 0 to 4% by volume based on the volume of the total of the compound of the formula (I) and the acrylic acid esters and methacrylic acid esters, on a cleaned surface of the aged asbestos slate and curing at ambient temperatures thereby producing a repaired asbestos slate having weather resistance and waterproofness.

7. A process for repairing an aged asbestos slate, which comprises cleaning the aged asbestos slate without removing aged portions of the slate, and coating a composition consisting essentially of (1) a curable component consisting of 100 to 25% by weight of a compound of the formula:

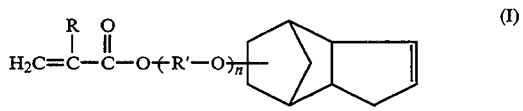

wherein R is hydrogen or a methyl group, R' is an alkylene group having 2 to 13 carbon atoms or an oxaalkylene group having 2 to 6 carbon atoms as a total obtained by bonding two or more alkylene chain segments having 2 or more carbon atoms via an oxygen atom, and n is zero or an integer of 1 and 0 to 75% by weight of one or more acrylic and/or methacrylic esters; and (2) a curing component consisting essentially of 2 to 6% by volume of an organic peroxide as a curing agent and a drying agent salt as an accelerating agent in an amount of 0 to 2% by volume based on the volume of the total of the compound of the formula (I) and the acrylic acid esters and methacrylic acid esters, on a cleaned surface of the aged asbestos slate and curing at ambient temperatures thereby producing a repaired asbestos slate having weather resistance and waterproofness.

8. A process for repairing an aged asbestos slate, which comprises cleaning the aged asbestos slate without removing aged portions of the slate; coating a composition consisting essentially of a compound of the formula:

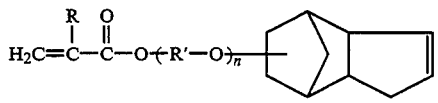

wherein R is hydrogen or a methyl group, R' is an alkylene group having 2 to 13 carbon atoms or an oxaalkylene group having 2 to 6 carbon atoms as a total obtained by bonding two or more alkylene chain segments having 2 or more carbon atoms via an oxygen atom, and n is zero or an integer of 1; 2 to 6% by volume of an organic peroxide as a curing agent; 0 to 4% by volume of a curing accelerator; and 0 to 2% by volume of a drying agent salt, said % by volume being based on the total volume of the compound of formula (I), on a cleaned surface of the aged asbestos slate; and curing at ambient temperatures thereby producing a repaired asbestos slate.

9. A process according to claim 8, wherein the compound of the formula (I) is at least one member selected from the group consisting of dicyclopentenyl acrylate, dicyclopentenyl methacrylate, dicyclopentenyloxyethyl acrylate, dicyclopentenyloxyethyl methacrylate, dicyclopentenyloxyisopropyl acrylate, dicyclopentenyloxyisopropyl methacrylate, dicyclopentenyloxyneopentyl acrylate, dicyclopentenyloxyneopentyl methacrylate, diethylene glycol monodicyclopentenyl ether acrylate, and diethylene glycol monodicyclopentenyl ether methacrylate.

10. A process according to claim 8, which further comprises coating a room temperature drying acrylic coating composition, an acrylic urethane coating composition, or a natural asphalt aluminum coating composition on the repaired asbestos slate.

* * * * *